United States Patent

Eachus

[15] 3,685,016

[45] Aug. 15, 1972

[54] ARRAY METHOD AND APPARATUS FOR ENCODING, DETECTING, AND/OR CORRECTING DATA

[72] Inventor: Joseph J. Eachus, Cambridge, Mass.

[73] Assignee: Honeywell, Inc., Minneapolis, Minn.

[22] Filed: Oct. 29, 1969

[21] Appl. No.: 872,230

[52] U.S. Cl. ........................................340/146.1 AL
[51] Int. Cl. ............................................G06f 11/08
[58] Field of Search ....................340/146.1; 235/153

[56] References Cited

UNITED STATES PATENTS

| | | | |
|---|---|---|---|
| 3,183,483 | 5/1965 | Lisowski | 340/146.1 |
| 3,243,774 | 3/1966 | Betz | 340/146.1 |
| 3,381,271 | 4/1968 | Van Duuren | 340/146.1 |
| 3,387,261 | 6/1968 | Betz | 340/146.1 |

*Primary Examiner*—Charles E. Atkinson
*Attorney*—Fred Jacob and Ronald T. Reiling

[57] ABSTRACT

Method and apparatus is provided for organizing source data into *k* data segments of *n* bits each. The source data may be considered to constitute an array where each data segment is a row and the bit positions of a data segment define the columns of the array. The encoding method and apparatus provide for generating a first series of check bits along the columns of the array as a first succession of exclusive-or functions. A second series of check bits are generated along diagonals of the array; where a diagonal is defined as a series of adjacent positions in successive rows of the array with the direction of adjacency being the same for all diagonals.

8 Claims, 14 Drawing Figures

INVENTOR
JOSEPH J. EACHUS

BY Lester S. Hecht
ATTORNEY

INVENTOR
JOSEPH J. EACHUS
BY
Lester S. Hecht
ATTORNEY

INVENTOR
JOSEPH J. EACHUS
BY Lester S. Hecht
ATTORNEY

INVENTOR
JOSEPH J. EACHUS
BY
Lester S. Hecht
ATTORNEY

INVENTOR
JOSEPH J. EACHUS
BY
Lester S. Hecht
ATTORNEY

ARRAY METHOD AND APPARATUS FOR ENCODING, DETECTING, AND/OR CORRECTING DATA

This invention relates to a method of encoding check code segments from source data and, more particularly, to method and apparatus for generating a plurality of check code segments from source data such that upon retrieval of the source data after entry of the check code segments, errors may be detected and, in some cases, errors may be corrected.

The basic scope of the invention may best be understood by first considering the well known Hamming "Error-Detecting and Correcting" system described in U.S. Pat. No. Re23,601. Referring now specifically to the Hamming patent, it will be noted that this technique relates to a method and apparatus for adding $k$ check bits to each code group of original data of $m$ information bits. The Hamming code configuration including the check bits has, therefore, $n$ bits, where $n = m + k$ bits (or "elements" in Hamming terminology).

As clearly set forth in the Hamming patent, the technique described therein is designed to detect and correct within a given code set. That is, the $k$ bits are appended to each code group in order to specifically identify which bit in the group is in error.

The present invention, on the other hand, is primarily concerned with determining which data segment contains an error, if any, where the data segment exists within a plural-segment data source, rather than being concerned with the determination of an error position within a data segment where only a single segment exists in the definition of the data source.

Consequently, it is important to note the entirely different definition of $n$, $m$ and $k$ according to the present invention relative to the Hamming disclosure. The term $k$ in the present disclosure relates to the maximum number of rows in the array or to the last row thereof. The term $n$ relates to the maximum number of bits in a segment or to the last bit in a segment, or it may relate to the maximum number of columns or last column of an array.

The initial determination of the invention on playback or reading of previously encoded data with check segments regards whether it is possible to determine which segment, if any, contains an error or possibly a pattern of errors. This determination cannot be uniquely made, according to the invention, unless $k$ is less than or equal to $n$. Since certain patterns of errors may have repeating subpatterns, the preferred practice of the invention specifies that $n$ be a prime number.

In its most basic form the invention contemplates encoding a first check segment with $n$ bits as a series of exclusive-or additions along each column of the array and encoding a second check segment with $n$ bits as a series of exclusive-or additions along a series of diagonals of the array, where the precise definition of the diagonals is considered in modulo $n$ exclusive-or summation terminology below.

Accordingly, a basic objective of the present invention is to provide an array encoding method for check codes so that location by data segment position in the array, rather than by bit position in the segment, is then possible.

Another object of the invention is to increase the efficiency of check code encoding for possible error detection and correction where efficiency is measured in terms of the number of check bits required relative to the number of data source bits.

It has been because of the inefficient use of the check bits according to the original Hamming technique that the so-called cyclic code checking technique has been developed. Specific reference to support the following discussion with respect to "Cycling Codes for Error Detection" is made to an article having this name published in the proceedings of the IRE, January 1961, by W. W. Peterson and D. T. Brown.

It will be noted in the "Cyclic Code" definition of the above-referenced article, that this technique is an extension of Hamming whereby a more efficient coding technique is possible. Thus, the Peterson article is again concerned with error detection and possible correction within a single data segment. In particular, the "Cyclic Code" technique is designed to generate a code which is hoped to be unique for the data segment, and is then appended to the segment in the fashion contemplated by Hamming.

It is important to note, therefore, that the prior art coding techniques discussed above are, in all cases, related to a single data segment, with the objective of the technique being to detect an error within a segment, and possibly to correct it.

A more exhaustive study of the prior art error checking techniques is found in "Digital Computer Design Fundamentals" by Yaohan Chu, published in 1962 by McGraw-Hill, particular reference being made to section 2 – 8 starting on page 78 and continuing with a list of other references on page 88.

The logical technique of expressing a parity check as a succession or series of "exclusive-or" functions is discussed in the Yaohan Chu reference above. This general expression will be used herein and completely defined for present purposes. The above reference, therefore, is not incorporated herein, but is merely mentioned as relevant prior art.

The distinguishing feature of the present invention is the use of a series of diagonals of an array to establish at least one additional check code segment. Once the source data has been interpreted as an $n$ by $k$ array according to the present invention and the check code segments have been encoded, a novel error detection and correction method is made possible.

When previously check-encoded data is to be read according to the method of the invention, the basic encoding technique is repeated with the final step being the formation of at least two error segments one of which must be a diagonal error segment. The term "error segment" as employed herein signifies a code having $n$ bits which contains no binary "ones" if there are no errors detected along the particular set of function lines such as a set of columns or a set of diagonals, the presence of "ones" indicating errors along the respective lines.

According to the method of detecting and conditional correcting provided by the invention, the error segments are analyzed to determine if there are any non-zero codes. Although the invention may be practiced with only a column error code and one of the two possible diagonal error codes, an important increase in correction reliability of "confidence" is accomplished when all three codes are used. Consequently, in the illustrative discussion which follows all three codes: column; left diagonal; and right diagonal will be assumed to be present.

According to the basic method of the invention, if two or three of the error codes contain all zeros, the data is labeled as "okay". In this case the additional diagonal error code has served the purpose of permitting a "majority" decision which otherwise would not be possible.

If only one of the three error codes contains all zeros the method herein described specifies that the data be labeled as "uncorrectable" which carries the implication that an error has been detected but cannot be corrected.

If none of the error codes contains all zeros, the novel segment location technique of the invention comes into play although cases still may arise, as will be seen, where the error cannot be corrected. At this point it may be noted that if the location, in terms of the row in the data array, can be uniquely specified as containing all possible errors, all of the errors may be corrected. Thus it will be seen that the present invention makes it possible to correct up to $n-1$ errors in a single data segment of $n$ bits.

The row location technique of the invention operates upon the novel principle that if all three of the error segments or patterns can be overlayed by the proper combination of cyclic modulo $n$ shifts as specifically defined below, the error pattern must exist within only one data segment and then may be corrected by reference to the initial column error code.

In the preferred practice of the pattern overlaying, the column error code is not cycled. An initial comparison is made among all three error codes. If three-way agreement is found, the error pattern must exist in the first (or zeroth) row. Failing this initial comparison, the left diagonal error code is cycled (modulo $n$) left, and the right diagonal error code is cycled right, and a three-way comparison is performed again. This comparison and shift operation is repeated until either three-way agreement occurs or $n$ comparisons have been completed without agreement. The number of cycles is counted to provide an index as to which row, if any, agreement was detected. If no agreement occurs an "uncorrectable" signal is generated.

Whenever a three-way error code check is accomplished, according to the method of the invention, an extremely reliable correction pattern is available. The "correctable"signal means that all errors fall within that data segment or row which is marked by the shift-count index. Furthermore, the column error code precisely defines what changes must be made to completely correct all errors.

Thus, if $n$ is selected to be a large prime number (the preference of a prime number will be clear after error patterns have been considered) such as 67, and a 67 by 67 array is specified, a total of 3 × 67 check bits make it possible, according to the invention, to correct up to 66 bits within one data segment.

From the above it should be apparent that the present invention is particularly advantageous when used with large tape or disc files where a data segment may consist of a whole record of perhaps several hundred bits and the check segments are then designed to specify the error to within a single record.

Once the error pattern is determined to exist within a predesignated data segment, according to the invention, a cyclic code check of the Hamming type could be employed if parity bits or the like have already been included in the source data. Although this combination of checks is suggested here to point out the different functions of the prior art and the present invention, it may be desirable to use the present invention throughout by using the column error code as the correction pattern rather than the Hamming or cyclic code checks individually.

Accordingly, it is another object of the present invention to provide a method and apparatus for reliably correcting an error pattern within a data segment in an $n$ by $k$ data source array.

Still another object of the invention is to provide a method and apparatus for error detection and possible correction wherein large sources of data may be analyzed with only two or three data segment check codes.

A more specific object of the invention is to provide apparatus for automatically cycling data segment codes left and right to form diagonal check codes.

Yet a further object of the invention is to provide a conditional error-correction method which may be used with a very high degree of "confidence."

The novel features which are believed to be characteristic of the invention both as to its organization and method of operation, together with further objects and advantages thereof will be better understood from the following description considered in connection with the accompanying drawings in which several embodiments of the invention are illustrated by way of examples. It is to be expressly understood, however, that the drawings are for the purpose of illustration only and are not intended as a definition of the limits of the invention.

FIG. 1 shows the basic $n$ by $k$ source array format contemplated by the invention and the general manner in which three check segments are organized;

FIG. 2 illustrated a specific example of the array of FIG. 1 where $n = 4$ and $k = 3$;

Figures 4, 5A, 5B, 5C:
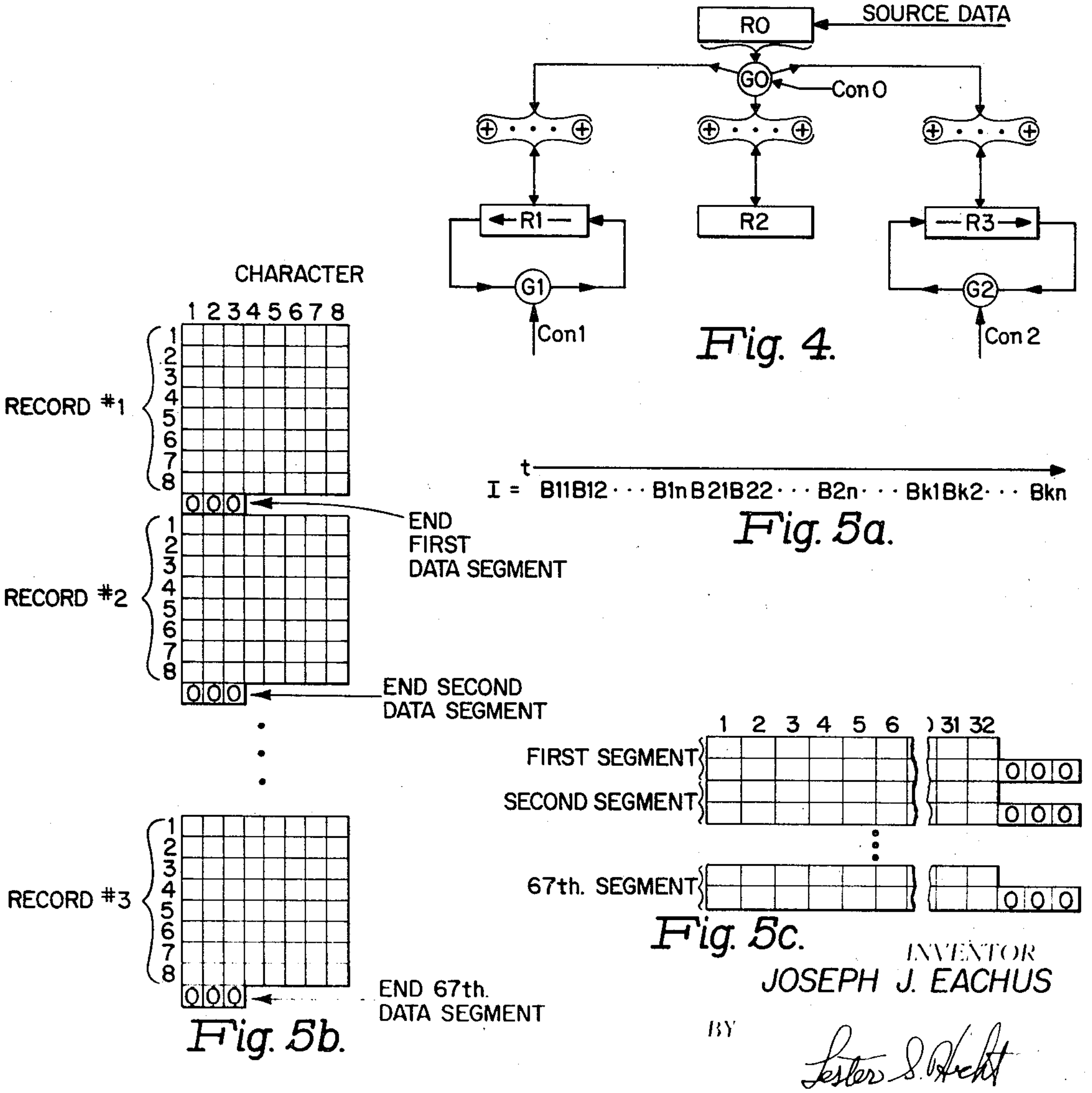
FIG. 4 is a schematic and block diagram of one form of apparatus which may be used for generating the check data segments.
Figure 6:
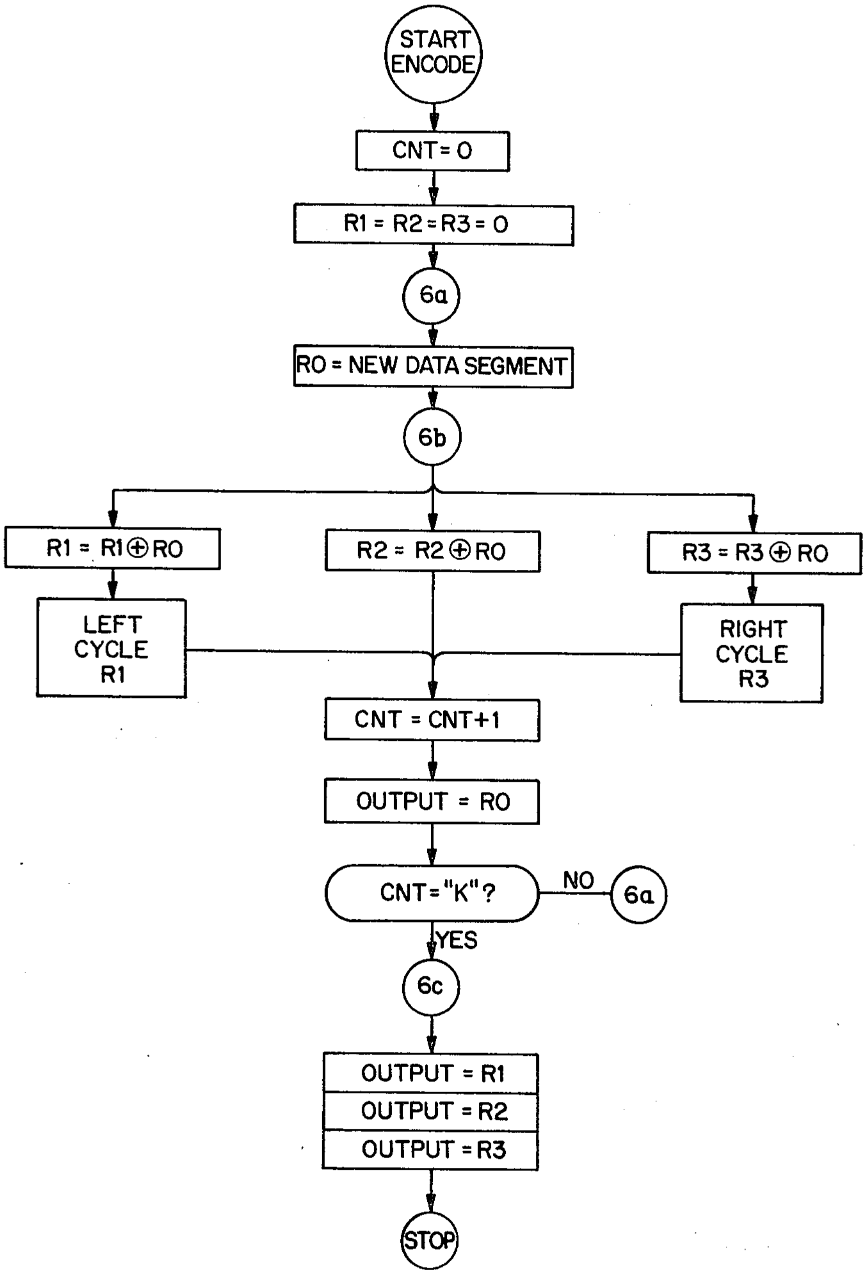
Figure 7:
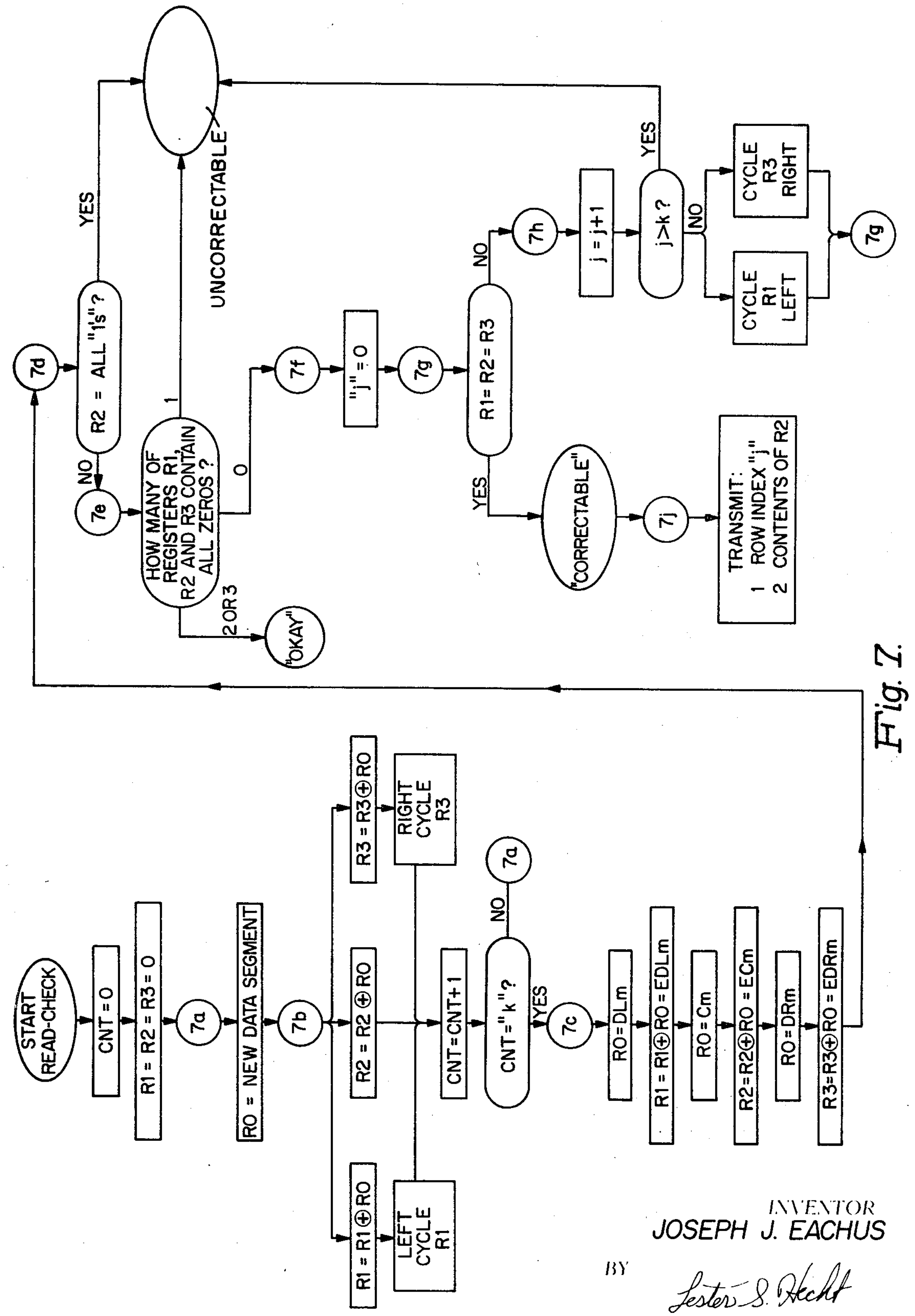
Figure 8A:
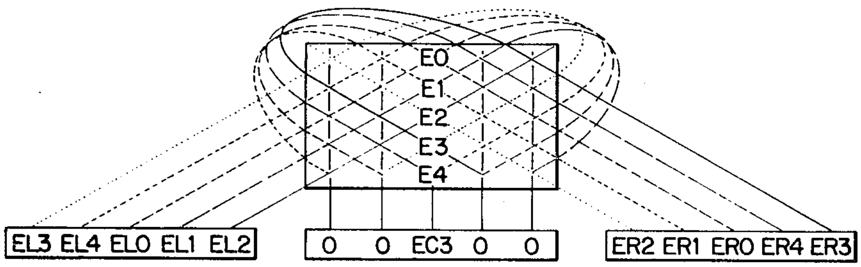
Figure 8B:
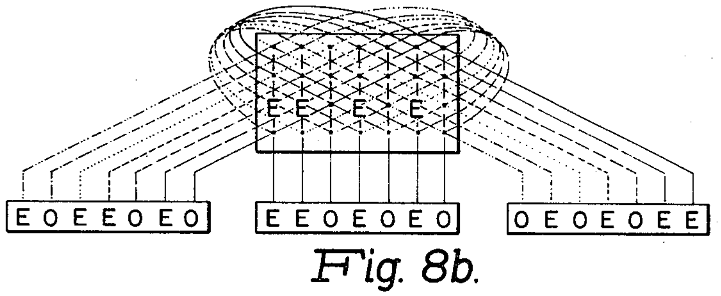

FIGS. 5*a*, 5*b* and 5*c* show three typical data formats which may be interpreted as $n$ by $k$ source arrays according to the invention;

FIG. 6 is a flow diagram depicting the method of encoding or writing the check data segments;

FIG. 7 is a flow diagram depicting the error detection and/or correction method of the invention; and FIGS. 8*a*, 8*b*, etc. are provided to illustrate various error patterns which may occur and to point out the basis for the preference of $n$ being a prime number.

Figure 1:
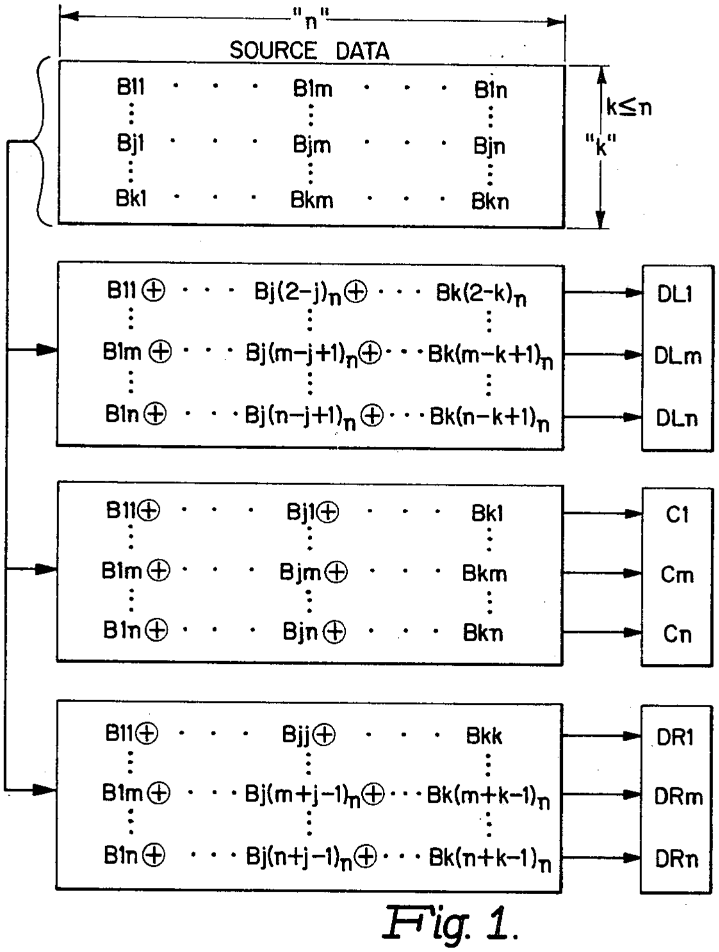

Reference is now made to FIG. 1 where source data is illustrated in a $k$ by $n$ array. Each bit position in the array is designated with a row and a column reference symbol. Starting from the upper left-hand corner we note that bit position B11 signifies the first row and the first column of the array. Continuing along the row, the second bit position would be B12 if it were shown. The generic term for all bits in the first row is B1*m*, where *m* may vary from 1 to *n* and the last term in the first row is designated as B1*n*. One specific case of the array of FIG. 1 will be considered with respect to FIG. 2 below.

The letter *J* is used to designate any of the *k* rows and thus the series B*j*1 . . . B*jn* represents any row in the array. The last row of the source data array of FIG. 1 is designated as B*k*1 . . . B*km* . . . B*kn* since *k* throughout the specification will represent the number of rows and also the last row in the array.

Although three check code series for check data segments are shown in FIG. 1 the invention may be practiced with two. One of the two must be a diagonal check code series. The derivation of the column code series is simplier and will be considered first. Each check bit in the column set, being referred generically as Cm, is derived from the following generic formula:

$$Cm = \sum_{j=1}^{j=k} \oplus Bjm$$

This generic formula can best be interpreted by means of a specific example. For this purpose a three-by-three array and a particular set of assumed values is represented below.

Three-By-Three Array and Assigned Values

| | | | | | |
|---|---|---|---|---|---|
| B11 | B12 | B13 | 1 | 0 | 1 |
| B21 | B22 | B23 | 0 | 1 | 1 |
| B31 | B32 | B33 | 0 | 1 | 0 |

In terms of logic, the three column check bits for the example above are defined as follows:

$$C1 = B11 \oplus B21 \oplus B31$$

$$C2 = B12 \oplus B22 \oplus B32$$

$$C3 = B13 \oplus B23 \oplus B33$$

The plus symbol with the circle around it ( ) represents an exclusive-or. Considering the definition of C1 for the first column, it will be noted that bit B11 is combined by exclusive-or with B21, and the result of this operation is then combined by exclusive-or with B31. Each exclusive-or is performed according to the following basic definition.

$$A \oplus B = A.B' + A'.B.$$

The above function is interpreted as follows. The exclusive-or of signals A and B is "true," "on," or in the binary "one" or "1" state if either A is "on" and B is "off," as represented by the term A.B', or if A is off and B is on, as it represented by the term A'.B. The prime ( ' designates the "off" state of particular Boolean variable. Thus we may express the first exclusive-or in the definition of C1 as follows:

$$B11 \oplus B21 = B11.B21' + B11'.B21.$$

Referring in particular to the three-by-three array example above, we find that B11 = 1 and B21 = 0, so that the exclusive-or resulting therefrom has a value of binary 1. The first exclusive-or must then be combined with B31 = 0, in our example. We may then express this total exclusive-or succession as follows:

$$(B11 \oplus B21) \oplus B31 = (B11 \oplus B21).B31' + (B11 \oplus B21)'B31.$$

In the case of our particular example with inserted binary values, the first exclusive-or function has a value of "one" so that we can then determine the final value of C1 by performing the second exclusive-or between binary "one" and B31 = 0. We know from the above analysis that the final result, and consequently the value of C1, is a binary 1. We have thus determined in a typical example one check bit of the column check segment. In a similar manner, it should be apparent that check bit C2 is a binary "zero"and that check bit C3 is also a binary "zero".

It may be considered that the column check bit is effectively a parity bit along a column since, according to the definition above, if only a single "one " exists in a column the check bit is a "one," whereas if two check bits exist in a column, the check bit is "zero." This analysis, of course, may be carried forward to cover the general situation where an odd number of "ones" in a column will result in a check bit of "one" and an even number of "ones" in a column will result in a check bit of "zero."

In order to formulate a compact expression for the various check bits, a summation expression is developed. The sign:

$$\sum \oplus$$

is introduced herein to represent a succession of exclusive-or additions. We then add the integer variables specifying the row position of the binary bits to provide the generic column check bit definition:

$$Cm = \sum_{j=1}^{j=k} \oplus Bjm$$

The next general expression to consider is the generic definition of the diagonal check bits. We will consider, for the purpose of a brief explanation, the case of the left diagonal, represented generically herein as "DL*m*.' Reference is made again to the specific case of a three-by three array as considered above. The definitions of DL1, DL2 and DL3 appear as follows:

$$DL1 = B11 \oplus B23 \oplus B32;$$

$$DL2 = B12 \oplus B21 \oplus B33; \text{ and}$$

$$DL3 = B13 \oplus B22 \oplus B31.$$

We note, in the case of the definitions of DL1 and DL2, that there is an effective "end-around" association of binary bits. In the case of DL1, the first exclusive-or is performed between B11 and B23. The result of this is exclusively-ored with B32. The sequence of columns of this operation is: 1, 3, 2. The end-around association in this case is the association of B11 around the array to B23. This association, permitting end-around shifting, can be defined in terms of module *n* numbers which will now be explained.

The general rule for using a number or modulo representation is that if the sum or difference of the modulo numbers exceeds the limits of from 1 to *n*, the result is corrected by adding or subtracting *n* for values which are below and above the limits, respectively. This is illustrated by the following examples:

$$(3+2)_3=(5)_3=2;\ (3-5)_3=(-2)_3;\ (1-1)_3=(0)_3=3.$$

In the first case the limit $n=3$ is exceeded by 2 so that $n=3$ is subtracted from 5 to form the new modulo 3 number which is 2. In the next example the intermediate result is $-2_3$ which is corrected by adding 3 to provide the answer of 1; and, finally, the difference $(1-1)_3$ provides a result of 3.

The molulo arithmetic just performed may also be considered to be a cycle shifting function. When $(3+2)_3$ is performed it may be considered to be an end-around right shift of two which proceeds: 3, 1, 2. The case $(3-5)_3$ is a left cycle which proceeds for 5 shifts as follows: 3, 2, 1, 3, 2, 1. The case $(1-1)_3$ is a single end-around left shift which proceeds: 1, 3.

Having defined the basic exclusive-or series and a technique for specifying bit positions in an array in terms of modulo $n$ we may now set forth the generic expressions for the left and right diagonals as follows:

$$DLm=\sum_{j=1}^{j=k}+Bj(m-j+1)_n$$

Figure 2:
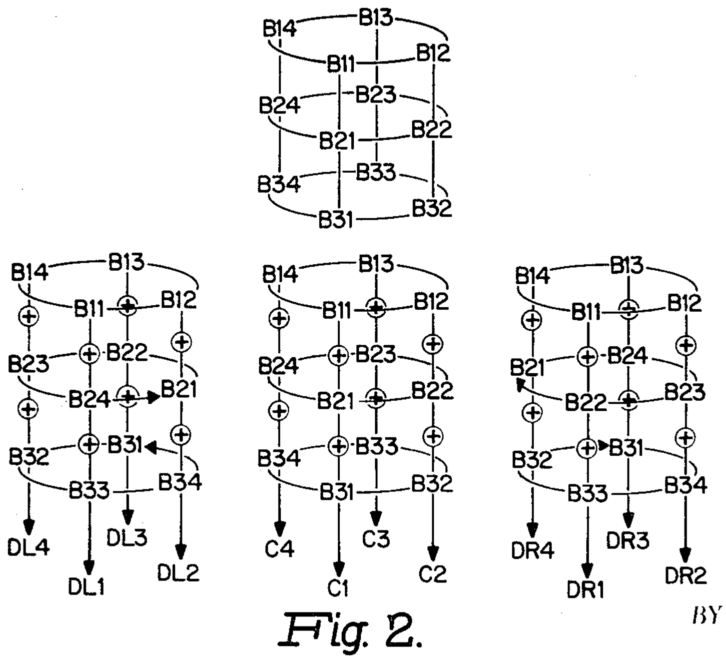

Reference is now made to FIG. 2 for a specific consideration of the manner in which the generic definitions of the diagonals apply to a specific case. It will be noted that FIG. 2 is shown as a series of endless rows or circles to indicate the modulo $n$ nature of each data segment with respect to its utilization according to the present invention.

Since, the example of FIG. 2, $k$ is less than $n$, there are 4 diagonals, although there are only 3 rows. Thus there is no end-to-end diagonal as in the case where $k=n$. Referring now to the generic formula for DLM as defined above, we may define the series of left diagonals by starting, for each diagonal definition, with one of the bits of the first row. In order to formulate a precise technique for definition it will be assumed that the first exclusive-or series defining DL1 will start with B11; the second exclusive-or series defining DL2 will start with B12; the third, DL3, starts with B13; and the fourth DL4, starts with B14. It will be understood of course, that the invention is not limited to this starting definition.

Considering now the generic formula for DLm as presented above, we will perform the necessary substitutions to obtain the left diagonal series. Starting with the bit B11 we have established our initial value for $j$ as being "1" and also have established our initial value for the column position $m$ as being "1". The summation then specifies that we increase the value of $j$ to determine the next term in the series, while maintaining $m=1$. With this substitution, we obtain $B2(1-2+1)_4=B24$; where $j=2$. The next term is found by using $j=3$ and still maintaining $m=1$ as follows:

$$B3(1-3+1)_4=B33.$$

Thus the series DL1 may be defined as:

$DL1=B11\oplus B24\oplus B33$. In a similar manner, the other left diagonal series may be defined as:

$$DL2=B12\oplus B21\oplus B34$$

$$DL3=B13\oplus B22\oplus B31$$

$$DL4=B14\oplus B23\oplus B32.$$

Using the generic definition of the right diagonal series, we may now set forth the specific definitions for the case of FIG. 2 as follows:

$$DR1=B11\oplus B22\oplus B33$$

$$DR2=B12\oplus B23\oplus B34$$

$$DR3=B13\oplus B24\oplus B31$$

$$DR4=B14\oplus B21\oplus B32.$$

Figure 3:
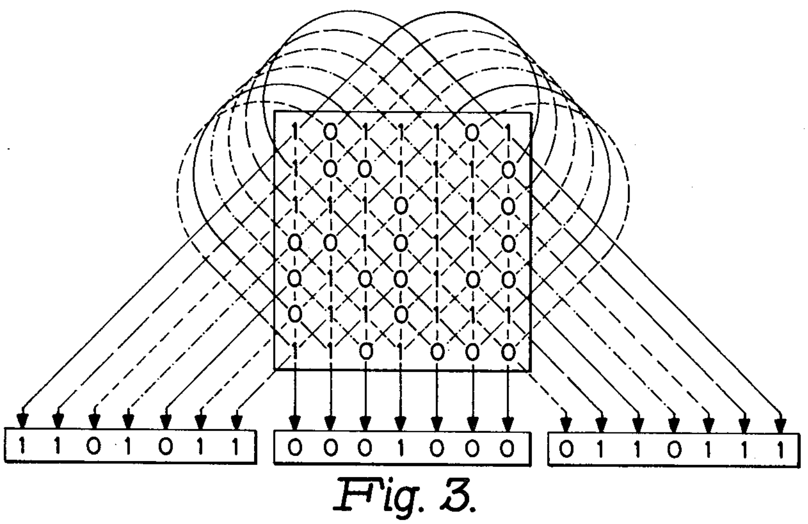
FIG. 3 shows an array with actual binary bits introduced therein to illustrate how actual values are determined for the check data segments.

Having considered the general technique for encoding the check data segments according to the present invention, reference is now made to FIG. 3 for the purpose of considering a specific coding pattern. It will be noted that each bit in each check data segment may be determined by manual method where the diagonal and column lines are run through the array to pass through the appropriate bits. If the number of bits having a value of binary ones along a line, thus defined, is odd, the corresponding check bit is entered as a "1", whereas if the number is even, the check bit is entered as a "0". Of course, an obvious alternative to the above would be to use a "0" to represent an odd number of binary ones along a line, and a "1" to represent an even number of binary ones. Either definition falls within the basic scope of the invention.

Before considering specific apparatus for accomplishing the check bit encoding as we have discussed above, it will be helpful to first consider the possible use of the check data segments once they are encoded. Suppose, for the purpose of this discussion, we assume that, after the source data has been analyzed in the manner discussed above, we then append the three check data segments to the source data. We may then treat this new file as the original array plus three appended check segment rows, which will tell us whether any of the data segments in the array contain errors. The method for accomplishing this is quite simple. When we read the source data from the file after check segment entry therewith, we again perform check segment encoding according to the method considered above.

The next step in the method of error detection is to compare the new set of check data segments with the original set of check data segments which were appended to the source array. This comparison may be performed by executing a series of exclusive-ors in corresponding bit positions of the old and new data segments. Assuming that an exclusive-or approach is followed, the result would be, in our example, three error segments which we will refer to as: EDL$m$, EC$m$, and EDR$m$ corresponding respectively, to the original check codes of DL$m$, C$m$, and DR$m$, and their respective new check codes.

Typical error patterns will be considered, in considerable detail, with reference to FIGS. 8. In this case, at least two of the check code patterns will contain discrepencies between the old and the new. Thus, according to the invention, error code patterns can be generated which may be analyzed, according to another method of the invention, to determine whether such errors have occurred within a single data segment. Once the second method of the invention has been performed, we may then enter into a third method whereby we can correct a complex pattern of errors, if we can determine, with a high degree of confidence, that all of these errors exist within one data segment.

Reference is now made to FIG. 4, for the purpose of showing how the basic encoding technique of the invention may be performed with very simple apparatus. The operation of the apparatus will be considered with reference to the use of a source data format of the type shown in FIG. 5*a*, where it is assumed that all of the bits of the source data appear serially in time starting with B11 and progressing through the first data segment serially and then continuing through successive data segments in the same manner.

Thus, in FIG. 4, a first register referenced as RO is employed to receive the series of source data bits and to shift them successively from right to left until all $n$ bits of one data segment appear in the register.

Three other registers: R1; R2; and R3 are shown in FIG. 4, being employed to generate the three check data segments mentioned above. These registers are initially set to all zeros to establish the check bit convention whereby an odd number of ones will result in a check bit of one and an even number will result in a check bit of zero. Thus, the operation is performed according to the exclusive-or series formulas previously discussed.

The bit positions in register RO are referenced as Bj1 ... Bj$m$ ... Bj$n$ to indicate the bit position correspondence with the bits of successive data segments. The bit positions of registers R1, R2 and R3 are referenced to correspond to the final check bit representation which will be contained therein.

Assuming the data format of FIG. 5*a*, the operation and logic of FIG. 4 will be explained with reference to the flow diagram of FIG. 6. As already noted, at the start of the operation the registers are set to zero. An additional function to be noted in FIG. 6 is that a counter, referenced as CNT, is also set to zero.

At step 6*a* the function is defined as RO = New Data Segment, which is the initial segment B11 ... B1$m$ ... B1$n$, or the first row for the first input.

Three exclusive-or functions are shown branching from entry point 6*b*: R1 = R1⊕RO; R2 = R2⊕RO; and R3 = R3⊕RO. At the outset, this will simply enter RO as the first data segment into R1, R2 and R3 which were initially zero.

Following these exclusive-or functions, register R1 is left cycled one position (modulo $n$ shift), and register R3 is right cycled one position. Register R2, corresponding to the column check bit series is not cycled. The left and right cycles correspond respectively to the operations required for generating DLm and DRm as considered above.

Having completed one logical operation as noted above, the system then increments the counter by: CNT = CNT + 1, and writes or otherwise transmits the contents of RO for possible utilization in a memory or other data utilization device.

A test is made to determine whether all segments have been logically combined by: CNT = $k$?, which results in a return to 6*a* if the answer is "No", or an entry into 6*c* for check data segment writing if the answer is "Yes" indicating completion of the encoding operation.

The specific mechanization of the hardware required for the embodiment of FIG. 4 should be obvious from the above description. A first series of exclusive-or gates, already defined, are controlled according to the encoding method of the invention to generate the left diagonal check bits DL1 ... DL$n$ in register R1. A second series of exclusive-or gates are controlled to generate the column check bits C1 ... C$n$, where register R2 receives the intermediate function bits and is not shifted; and a third series of exclusive-or gates are used to generate the intermediate function bits in register R3 where the final result is the series DR1 ... DR$n$.

The specific mode control hardware required to automate the steps shown in FIG. 6 should also be obvious to one skilled in the art of mechanizing logic. Specifically, a first mode is established corresponding to the initial steps, a second mode is established to control the loop starting with 6*a*, and a third mode is established following the test for the non-return to 6*a* to control the operation of the steps starting with 6*c*.

An important variation in the invention concept will now be considered with reference to FIG. 1. It has been assumed, for the purpose of clarity only, that as the bits of each data segment are read in the format of FIG. 5*a*, they become one of the rows of the array generically defined in FIG. 1. Thus, $n$ bits have been assumed to exist in each data segment.

The broad concept of the invention is not so limited. The data segment may be considered as well to lie along the column of the array where there are $n$ bits in each segment and a total of $k$ segments, as before.

It is important, therefore, in interpreting the generic summations derived above to note the following. Where the data segment defines the column, rather than the row, B$jm$ must be interpreted as the bit in the "$j$th" column and the "$m$th" row. The restriction that $k$ be less than or equal to $n$ will still apply because if $k$ were to be greater than $n$ precise location of a data segment wherein all errors lie could not be determined. Only an interchange between rows and columns has occurred.

The structure of FIG. 4 will not operate with the data segment column concept just covered. In this case the check bits of the columns are generated as separate parity bits in the same manner as the conventional serial parity bits well known in the present art. Although the generic method of the invention applies equally to either row or column data segments, the apparatus technique for encoding the diagonals in the case of column segments will be noted to be very difficult. Accordingly, although the method of the invention is not so limited, the preferred practice of apparatus utilization according to the invention does specify that the data segments be defined as corresponding to the rows of the array.

Reference is now made to FIGS. 5*b* and 5*c* showing typical character and word data formats which may constitute the source data. The character format of FIG. 5*b* shows eight bits in each character and a record total of eight characters, although actual practice may involve different bit lengths and most likely many more characters per record.

Since the product of eight bits by eight characters provides only 64 bits total, and since the invention specifies that $n$ preferably (as will be considered below) should contain a prime number of bits, three "0" bits are assumed in FIG. 5b to fill the assumed record out.

In using the method of the invention the total collection of eight characters and three "0" fill-in bits is defined as one data segment so that the complete source array will contain 67 sets of such groups or segments.

In the case of the assumed format of FIG. 5c, each word contains 32 bits and two words are assumed to comprise one data segment to that, again, three "0" bits are added to define the desired prime number $n = 67$.

Reference is now made to FIG. 7 where the read-check method of the invention is illustrated. Steps 7a and 7b will be noted to correspond to steps 6a and 6b of FIG. 6, respectively. It is assumed again for this explanation that the format of FIG. 5a is used, that data segments constitute the rows of the array, and that the hardware of FIG. 4 may be employed for automated operation of the invention.

At the completion of $k$ cycles of steps 7a and 7b registers R1, R2 and R3 will contain three new check data segments. Step 7c is entered to form three exclusive-or functions on the old and new DL$m$ to form EDL$m$, on the old and new C$m$ to form EC$m$, and on the old and new DR$m$ to form EDR$m$. These error segments may be entered into registers R1, R2 and R3 in exactly the same manner as all other exclusive-or functions have been formed.

Before considering the specific operation of step 7c, it will be helpful to study the error cases set forth in FIG. 8. The analysis of these error cases will also clarify the preference of selecting $n$ as a prime number.

In FIG. 8a a five-by-five array is shown with a set of errors in the same column. The correspondence between the data errors and the check bits is specified by using EL0 ... EL4 for the left error bits, EC3 for the column error (all errors in the example being assumed to be in column 3) and ER0 ... ER4 for the right error bits.

It can be determined immediately that if more than one of the errors of the type shown in FIG. 8a occur, comparison for equality of the bit patterns between either of the diagonals and the column error pattern becomes impossible because each of the diagonals will contain two or more "one" bits representing the errors.

It will be assumed in the immediately following discussion that only one of the data errors E0 ... E4 can exist at a time so that data segment location according to the invention is then possible as will now be considered.

If E0 is the error which is present, all three of the error segments will be the same so that the correction method of the invention then specifies that the first or zeroth row (for the purpose of error designation only) contains the error and that this error may be corrected by changing according to the pattern in the column error code.

In each of the other cases the amount of left cycle for the left diagonal error pattern and right cycle for the right diagonal error pattern required to develop three identical patterns is also the unique designation of the row in which the error exists. Thus EL3 must be shifted end-around to the left three times to align with the column position of EC3, and ER3 must be cycle shifted three positions to the right to obtain alignment. Thus the number of shifts in the case where only a single row or data segment contains the error uniquely designates the location by data segment where the error occurs.

Thus far we have considered only a single error in one data segment or row. The same approach applies to any number up to $n$ less one ($n - 1$) of errors within a single row or data segment. A patter of errors is thus specified in the fourth row of a 7 by 4 array in FIG. 8b. Thus three shifts of the EDL bits to the left and the EDR bits to the right will cause three-way agreement of all three registers and thus specify the fourth row of the array as requiring correction.

Figure 8C:
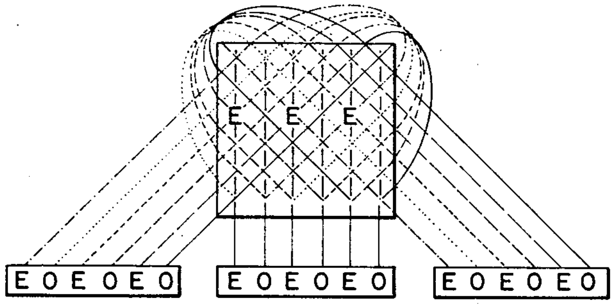

If the register length had a factor, such as 2, and the error pattern within a data segment has a repeated subpattern as is illustrated in FIG. 8C, where $n$ equals 6 ($3 \times 2$) and $k$ is 6, a unique designation of the segment wherein the error pattern occurs is not possible. This results because of the fact that three-way equality will occur a number of times corresponding to the number of times a subpattern is repeated if $n$ has this number as a factor. Consequently, the preferred practice of error correction according to the invention specifies that $n$ be a prime number so that there can be no factors permitting comparison equality for any subpatterns.

Figure 8D:
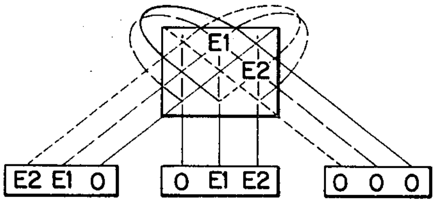

The importance of the "confidence" factor where three check codes are used and three error patterns are thus available for the determination of the location of the data segment wherein all errors must exist for correction to be possible, is illustrated in FIG. 8d where in a simple three-by-three array with error E1 in row one, column two, and error E2 in row two, column three, three-way comparison is impossible because the right diagonal does not show any error pattern.

Figure 8E:
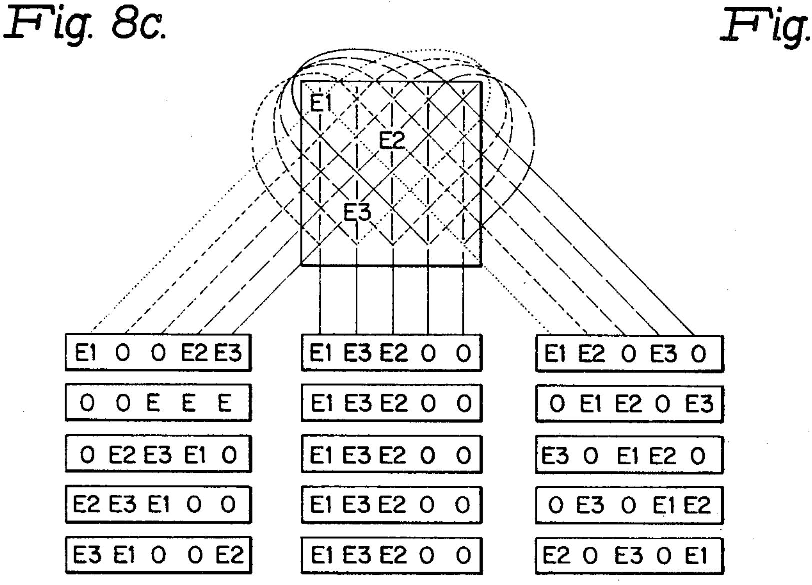

In FIG. 8e all three error codes have three error bits therein, but three-way agreement which are shown in FIG. 8e as cycles 0 through 4. This illustrates the pattern testing technique of the invention whereby a high level of "confidence" will accompany a signal or decision designating the data as "correctable".

Reference is now made again to FIG. 7 with particular reference to step 7c. The purpose of the sequence of steps starting with 7c is to exclusive-or the old check segments, which were entered according to the encoding method of the invention, with the new check segments which are presently in R1, R2 and R3. This is accomplished by successively reading DL$m$ into RO for exclusive-oring with R1, then reading C$m$ into RO for exclusive-oring with R3. The final result at the end of sequence starting with step 7c is that three error codes: EDL$m$, EC$m$, and EDR$m$ are in registers R1, R2 and R3, respectively.

The analysis of the error codes thus generated begins with step 7d where the initial determination to make is whether R2, corresponding to EC$m$ contains all "1's". If the all "1" condition has occurred an immediate branch is made to the "uncorrectable" exit as shown in FIG. 7c. If at least one error bit is a "0" in EC$m$, the test for possible correction continues with the first comparison of R1, R2 and R3 to determine whether all registers contain all "0'S". This step or entry point is labeled as 7e.

There are three exits from step 7*e*. If only one of the three registers contains all zeros exit is made to "uncorrectable" because it is obvious that a three-way comparison cannot be possible. If two or three of the registers are all zeros, the source data is determined to be "okay" and a corresponding exit is made. If none of the error patterns is all zeros, exit is made to 7*f* which will perform the succession of three-way comparisons considered above in several illustrative cases with reference to FIG. 8.

Step 7*f* involves only the clearing of the row index by: $j = 0$. The three-way comparison is defined in step 7*g* as: R1 = R2 = R3 ?. If the answer is "yes" at any time exit is made to "correctable". Whenever the answer is "no" step 7*h* is entered where $j$ is incremented by: $j = j + 1$, and then the new row index ($j$) is compared with the limit, $k$ by the test: $j > k$?.

If the incremented row index, $j$, exceeds the last row $k$, exit is made to "uncorrectable" because no three-way agreement was found. If the limit $k$ has not been exceeded register R1 is cycled left and register R3 is cycled right, the method then returns to step 7*g* for another comparison.

If will be noted that the "correctable" exit is shown as entering a function specified as step 7*i* where the information required for the actual correction is listed. This is: the row index $j$ which designates the data segment wherein the error pattern exists; and the contents of R2 which contains the column error pattern EC*m*. The actual correction may be made manually, by computer program, or by special hardware which addresses the data segment and performs the exclusive-or between this selected segment and the error pattern EC*m*.

From the foregoing it should now be apparent that the invention provides a new method and apparatus for error detection and possible correction where data segments, preferably containing a prime number of bits, may be reliably specified as wholly containing an error pattern as containing no errors, or as not containing all errors, and may then be corrected, labeled as "okay", or labeled as "uncorrectable".

I claim:

1. A method of detecting errors in source data where the source further includes at least two check data segments, each of which contains $n$ bits, one of said check data segments being related to said source data as a series of successions of exclusive-or functions along diagonals of an array derive from said data source, where a diagonal is defined as a series of adjacent positions in successive rows of the array, with the direction of adjacency being constant for all diagonals, said method comprising the following steps: generating a set of new check data segments corresponding respectively to said check data segments; performing the exclusive-or of said one check data segment with the one of said new check data segment which is developed along the diagonals of the array to produce a first error segment; performing the exclusive-or of said other check data segment with the other of said new check data segments to produce a second error segment; comparing said error segments with successive shifts of said first error segment until agreement occurs and counting the number of shifts required for agreement.

2. The method defined in claim 1 wherein said source includes three old check data segments DL*m*, C*m*, and DR*m*, and where three new check data segments corresponding respectively to said old check data segments are generated being referred to herein as NDL*m*, NC*m*, and NDR*m*, the method including the steps of performing the exclusive-ors: $EDLm = DLm \oplus NDLm$; $ECm = Cm \oplus NCm$; and $EDRm = DRm \oplus NDRm$.

3. In a system wherein source data containing $k$ data segments of $n$ bits each is stored along with check segments DL*m*, C*m*, and DR*m*, a device for detecting and correcting errors, said device comprising: first means for generating new check segments NDL*m*, NC*m*, and MDR*m*; second means for generating error segments EDL*m*, ECm, and EDR*m* as respective exclusive-or functions of DL*m* and NDL*m*, C*m* and NC*m*, and DR*m* and NDR*m*, respectively; third means for comparing EDL*m*, EC*m*, and EDR*m*; fourth means for left cycling EDL*m* and for right cycling EDR*m*; and fifth means for counting the number of comparisons performed by said third means; said third means being operated to repeat the comparison of the error segments after each cycle until three-way agreement occurs or $k$ comparisons have been performed.

4. The device defined in claim 3 wherein $n$ is a prime number.

5. The device defined in claim 3 wherein said second means includes three registers R1, R2, and R3 for generating EDL*m*, EC*m*, and EDR*m*, respectively.

6. A method of detecting errors in source data where the source includes three check data segments, a left-diagonal check segment, a right-diagonal check segment, and a column check segment formed by performing a series of exclusive-or functions along left and right diagonals and along columns, respectively, of an array derived from said data source, the method including: generating new left-diagonal, right-diagonal and column check segments after transmission of said source data; performing exclusive-or operations between said left-diagonal and said new left-diagonal check segments to form a left-error segment; performing exclusive-or operations between said right-diagonal and said new right-diagonal check segments to form a right-error segment; and performing exclusive-or operations between said column and said new-column check segments to form a column-error segment; comparing said error segments with successive shifts left and right of said left and right error segments until three-way agreement is reached, and counting the number of comparisons prior to three-way agreement to provide a row index.

7. A method as set forth in claim 6 wherein said array contains $k$ data segments and the method further comprises generating an uncorrectable error signal if said number of comparisons reaches $k$ without agreement.

8. A method for generating error checking data for serially transmitted source data comprising:

a. forming the serial data into groups of $n$ bits,
b. entering a group into a register,
c. shifting the contents of said register by one bit,
d. entering a new group into said register through an exclusive-or operation,
e. shifting the contents of said register by one bit,
f. repeating steps (d) and (e) until $k$ shifts have been accomplished, g. wherein ($k$) ($n$) equals the number of bits in the source data.

* * * * *

UNITED STATES PATENT OFFICE
CERTIFICATE OF CORRECTION

Patent No. 3,685,016 Dated August 15, 1972

Inventor(s) Joseph J. Eachus

It is certified that error appears in the above-identified patent and that said Letters Patent are hereby corrected as shown below:

In the drawings, sheet 5, Fig. 8c, the second error pattern of the first column should read:

-- |0 0 E2 E3 E1| --.

Signed and sealed this 8th day of January 1974.

(SEAL)
Attest:

EDWARD M.FLETCHER,JR.
Attesting Officer

RENE D. TEGTMEYER
Acting Commissioner of Patents